United States Patent
Engström

(10) Patent No.: US 8,229,483 B2
(45) Date of Patent: Jul. 24, 2012

(54) METHOD FOR MAPPING A COVERAGE AREA

(75) Inventor: Stefan Engström, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 573 days.

(21) Appl. No.: 12/440,325

(22) PCT Filed: Sep. 6, 2006

(86) PCT No.: PCT/SE2006/001021
§ 371 (c)(1),
(2), (4) Date: Mar. 13, 2009

(87) PCT Pub. No.: WO2008/030146
PCT Pub. Date: Mar. 13, 2008

(65) Prior Publication Data
US 2010/0003993 A1 Jan. 7, 2010

(51) Int. Cl.
*H04W 16/32* (2009.01)
(52) U.S. Cl. .......... 455/466; 455/67.11; 455/67.13; 455/226.1; 455/226.2
(58) Field of Classification Search .......... 455/466, 455/67.11, 67.13, 115.1, 115.3, 115.4, 132, 455/133, 134, 161.2, 161.3, 446, 63.1, 63.4, 455/226.1–226.4
See application file for complete search history.

(56) References Cited

U.S. PATENT DOCUMENTS

| | | | |
|---|---|---|---|
| 7,313,391 B2 | 12/2007 | Gutowski | |
| 7,440,762 B2 * | 10/2008 | Maloney et al. | 455/456.1 |
| 7,689,240 B2 * | 3/2010 | Anderson | 455/522 |
| 2004/0018843 A1 * | 1/2004 | Cerwall et al. | 455/450 |
| 2006/0052114 A1 * | 3/2006 | Cuffaro | 455/456.1 |
| 2006/0063545 A1 * | 3/2006 | Yang et al. | 455/513 |
| 2006/0071854 A1 * | 4/2006 | Wilcox | 342/458 |
| 2006/0276134 A1 * | 12/2006 | Marinier et al. | 455/63.1 |
| 2011/0263277 A1 * | 10/2011 | Zuniga Gallegos | 455/466 |

FOREIGN PATENT DOCUMENTS

| | | |
|---|---|---|
| JP | 2009-026449 | 1/1997 |
| JP | 2004-096266 | 3/2004 |
| JP | 2005-303476 | 10/2005 |

* cited by examiner

*Primary Examiner* — Cong Tran

(57) ABSTRACT

A method for calculating path loss PL at a point P in a coverage area CA of an antenna at a cell site. The method comprises the steps: transmitting a signal from the antenna, the antenna having an effective antenna gain Gant, and measuring a received signal strength indicator RSSI of the transmitted signal by a receiving antenna at the point P. The method further comprises the steps: determining a dominant indirect radiation path between the antenna and the receiving antenna to establish the effective antenna gain Gant from the antenna in a direction of the dominant indirect radiation path, and calculating path loss PL at the point P using the established effective antenna gain Gant and measured received signal strength indicator RSSI. A method for mapping a coverage area, a method for simulating changes in a communication network and a system for cell planning.

16 Claims, 3 Drawing Sheets

METHOD FOR MAPPING A COVERAGE AREA

TECHNICAL FIELD

The present invention relates to a method for calculating path loss to one or more points in a coverage area of an antenna at a cell site.

BACKGROUND

Cell planning within mobile communication systems, such as GSM is an important task for telephone operators to optimize the performance for mobile telephone users. The mobile communication system comprises a network containing a plurality of sites, each site have one or more antennas providing coverage for a cell coverage area. In a present cell planning tool, an operator provides measured data from selected points in the coverage area as input data to the cell planning tool. The input data is obtained by measuring the signal strength at the selected points. If a change occurs in the network during a network tuning stage, the measured signal strength cannot always be reused. This problem is solved by converting the measured signal strength at the selected points into path loss and use the path loss as input data in the cell planning tool. The path loss may be reused for all changes in the network, except for changes in the physical antenna position or frequency band changes.

The path loss is calculated by taking the transmitting power $P_{tx}$ from the antenna and subtracting the known received signal strength indicator RSSI of a signal. The path loss equation may be expressed as:

$$\text{Path loss[dB]}=P_{tx}\text{[dBm]}-\text{RSSI[dBm]}, \tag{1}$$

The transmitting effective isotropically radiated power (EIRP) $P_{tx}$ may be expressed as:

$$P_{tx}\text{[dBm]}=P_{in}\text{[dBm]}+G_{ant}\text{[dB]}, \tag{2}$$

where $P_{in}$ is the known input power to the antenna and $G_{ant}$ is the effective antenna gain. The effective antenna gain $G_{ant}$ is calculated by estimating the angles of direction $\bar{\alpha}$ (which could be expressed in Cartesian coordinates x,y,z or azimuth $\alpha_{azimuth}$ and elevation $\alpha_{elevation}$) between the transmitting and receiving antennas and mapping these angles to the 3-dimensional antenna pattern.

In US 2002/0063656 A1, by Tanley J. Gutowski, a standard procedure for estimating the angles of directions is disclosed. A straight line is drawn from the transmitting antenna position to the receiving antenna position when calculating the path loss. This approach usually has enough accuracy but will produce erroneous results in specific environments with indirect signal paths, such as reflected signal paths in an area with high buildings.

SUMMARY

An object with the present invention is to provide a method for calculating the path loss in an antenna's coverage area at an antenna site with indirect signal paths, which calculated path loss may be reused when the radiation characteristics of the antenna at the antenna site is changed.

This object is achieved by determining a dominant radiation path for measurement points in the antenna's coverage area. If the dominant radiation path is an indirect path, e.g. reflected or diffracted path, correct angles of direction for a transmitted signal from the antenna are determined. An indicator for received signal strength is measured at each measurement point and a path loss is calculated using the correct angles of direction. Path loss and angles of direction characterize each measurement point and may be reused when the characteristics of the antenna are changed during operation.

Another object is to provide a method for mapping a coverage area, a method for simulating changes in a communication network and a system for cell planning, using the dominant radiation path between a receiver and a transmitting antenna to establish an effective antenna gain and thus a correct path loss and angles of direction at each measurement point in a coverage area.

An advantage with the present invention is that measured signal strength at points within a highly reflective environment will generate a more accurate path loss than prior art solutions, which path loss may be reused if the antenna characteristics are altered during operation.

A further advantage is that a suggested change in antenna characteristics may be simulated and a simulated coverage calculated based on measurements before the change is implemented in a communication network.

DETAILED DESCRIPTION

The basic principle of the present invention is to determine an actual transmitting direction from an antenna along a dominant radiation path to a receiver at a point within the coverage area of the antenna. Each antenna has an antenna gain $G_{ant}$ which varies dependent on the angle of direction, as specified by the antenna manufacturer, i.e. in a three-dimensional antenna pattern. If the dominant radiation path between the antenna and the receiver is indirect, e.g. reflected or diffracted against buildings, then the angle of direction from the antenna along the radiation path differs from the estimated angle of directions according to prior art, i.e. using a straight line between the antenna and the receiver to estimate the angle of direction.

In a cell planning tool, used by telephone operators, measured data from a plurality of points within a coverage area of an antenna are stored. These data contain the position of each point and corresponding path loss. The path loss is derived from measured signal strength at each point, and previously stored path loss may normally be reused for all cell changes except physical antenna position change and frequency band change.

Figure 1:
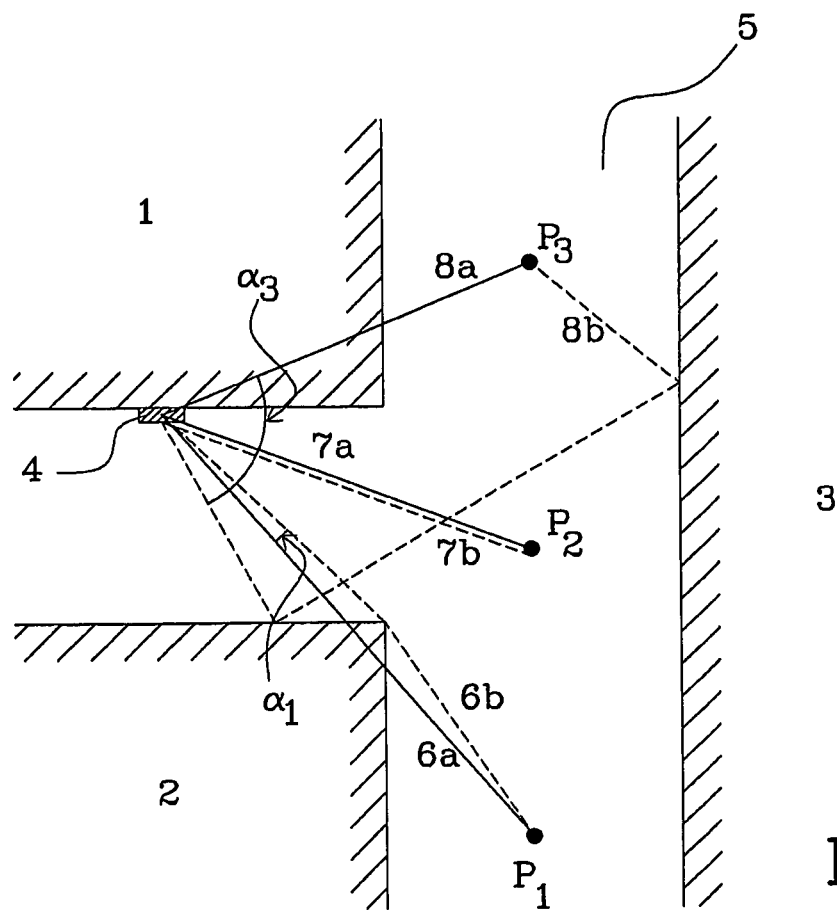
FIG. 1 shows a top view of a metropolitan area illustrating direct and indirect radiation paths.
Figure 2:
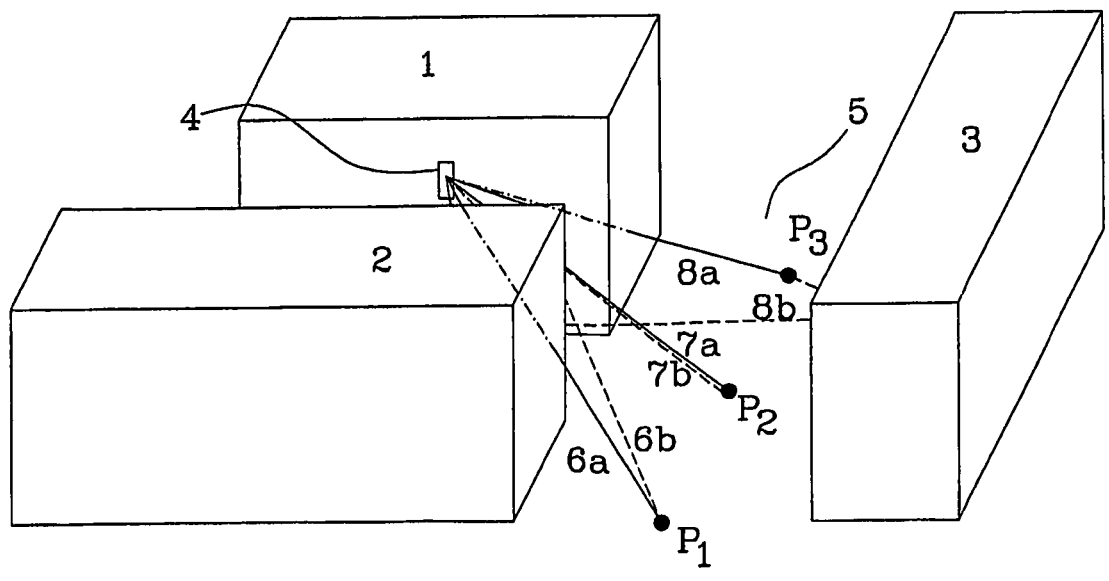
FIG. 2 shows a perspective view of the top view in FIG. 1.

The standard procedure for estimating the angle of directions is to draw a straight line from the transmitting antenna position to the receiving antenna position, as discussed above. This approach usually has enough accuracy but has been seen to give erroneous results in a specific environment. If the dominant signal received by the mobile receiver has not taken the closest route, but has been reflected and/or diffracted along the signal path, the estimated angles of directions may be completely wrong based on the prior art approach. FIGS. 1 and 2 illustrate this clearly.

FIG. 1 shows a top view of a metropolitan area with three buildings 1-3, a base station antenna 4 mounted to a wall of building 1, and three measurement points $P_1$, $P_2$, $P_3$ indicated on a street 5 along building 3. A direct radiation path (illustrated by a solid line), and a dominant radiation path (illustrated by a dashed line), are shown between the antenna 4 and each point $P_1$-$P_3$.

FIG. 2 shows a perspective view of the same metropolitan area as in FIG. 1. Signals along the direct radiation paths (solid lines) for point $P_1$ and $P_3$ are illustrated to propagate through the obstacles, i.e. the buildings.

Point $P_1$ is positioned along street 5 between building 2 and 3 with no free line of sight. The direct radiation path, solid line 6a is blocked by building 2 and the dominant radiation path, dashed line 6b, diffracts around the corner of building 2, and the dominant radiation path is thus indirect. The angle of direction for the direct radiation path 6a and the dominant indirect radiation path 6b from the antenna 4 differs, which is illustrated by the angle $\alpha_1$. When measuring a received signal strength indicator (RSSI) at point $P_1$, the received dominant signal has angles of direction from the transmitting antenna 4 that differs $\alpha_1$ from the angle of direction for the direct radiation path 6a. This information needs to be taken into account when establishing an effective antenna gain $G_{ant}$ in the correct direction (i.e. along the indirect radiation path 6b) and subsequent calculation of path loss to point $P_1$.

Point $P_2$ is positioned between points $P_1$ and $P_3$ and has a free line of sight to the base station antenna 4. In this case the direct radiation path, solid line 7a, coincides with the dominant radiation path, dashed line 7b. Thus, the dominant radiation path is straight. The angle of direction from the antenna 4 is estimated, and path loss to point $P_2$ is calculated, in accordance with prior art techniques.

Point $P_3$ is positioned along street 5 between building 1 and 3 with no free line of sight. The direct radiation path, solid line 8a is blocked by building 1 and the dominant radiation path, dashed line 8b, reflects against the walls of building 2 and 3, and the dominant radiation path is thus indirect. The angle of direction for the direct radiation path 8a and the dominant indirect radiation path 8b from the antenna 4 differs, which is illustrated by the angle $\alpha_3$. When measuring a received signal strength indicator (RSSI) at point $P_3$, the received dominant signal has angle of direction from the transmitting antenna 4 that differs $\alpha_3$ from the angle of direction for the direct radiation path 8a. This information needs to be taken into account when establishing an effective antenna gain $G_{ant}$ in the correct direction (i.e. along the indirect radiation path 8b) and subsequent calculation of path loss at point $P_3$.

As illustrated in FIG. 1, the difference in angle of direction between the direct signal and the diffracted or reflected signal may be significant, especially for point $P_3$, and the effective antenna gain will most likely be quite different for the two signals. It should be noted that the illustrated difference in angles of direction $\alpha_1$, $\alpha_3$ may be a function of both azimuth $\alpha_{azimuth}$ and elevation $\alpha_{elevation}$.

A combination of both reflection and diffraction may naturally also generate the dominant radiation path between the antenna 4 and a measurement point.

Figure 3:
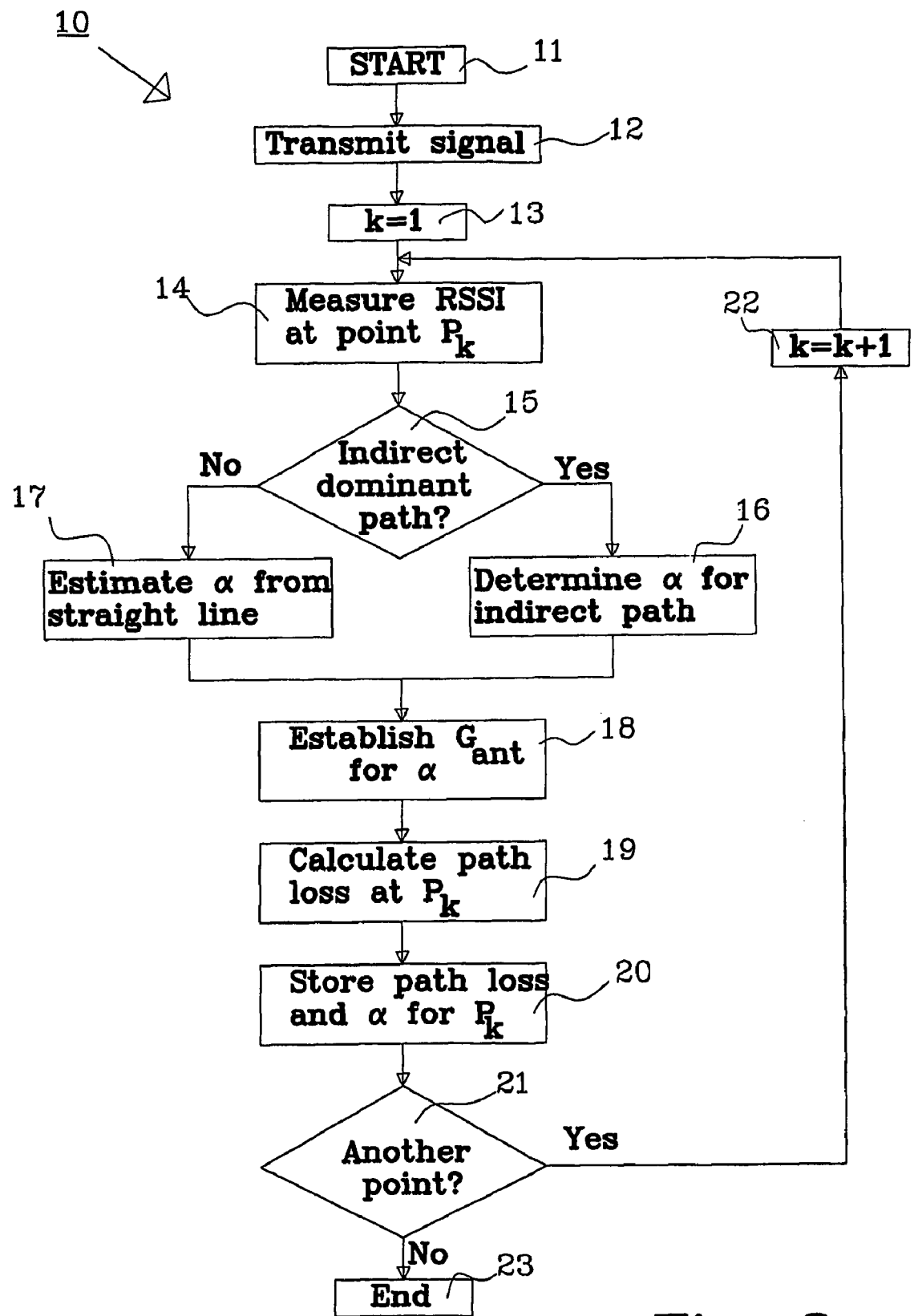
FIG. 3 shows a flow chart for calculating path loss according to the invention.

FIG. 3 shows a flow chart 10 for calculating path loss PL at one or more points within a coverage area of an antenna, as shown in FIGS. 1 and 2. The flow starts, step 11, and proceeds to transmit a signal from the base station antenna, step 12. An input power $P_{in}$ is fed to the antenna, which has an effective antenna gain $G_{ant}$ that depends on the angles of direction and a 3-dimensional antenna radiating pattern. Thus, the transmitting effective isotropically radiated power (EIRP) $P_{tx}$ of the signal from the antenna depends on the angles of direction.

A counter k is set to one (k=1) in step 13, where k is used as an index for points (i.e. positions) within the coverage area, and a received signal strength indicator RSSI for point $P_1$ is measured in step 14. A dominant radiation path is determined for point $P_1$ in step 15. If the dominant radiation path is an indirect, i.e. reflected or diffracted, the flow proceeds to determine angles of direction $\overline{\alpha}$ for the dominant indirect radiation path in step 16. This step is preferably performed by applying a propagation model, such as a Ray-Tracing propagation model, to calculate which received signal is the dominant signal at the receiver at point $P_1$, and thereafter determine the angles of direction that the dominant signal left the transmitting antenna. On the other hand, if the dominant path is the direct radiation path, the flow proceeds to estimate angles of direction $\overline{\alpha}$ for the dominant direct radiation path in step 17, which is a straight line between the antenna and the receiver.

The angles of direction $\overline{\alpha}$ for the dominant radiation path are used to establish the effective antenna gain $G_{ant}$ in step 18. The effective antenna gain is determined as a function of the direction the dominant signal left the transmitting antenna, i.e. the angles of direction estimated in step 17 or determined in step 16.

Path loss is thereafter determined in step 19 using Eq. (1) and (2). The information regarding path loss and angles of direction for point $P_1$ is stored in a memory or database in step 20 for future use. A decision to proceed with measurement in more points within the coverage area is made in step 21. If measurements should be performed in another point, k is increased by one (k=k+1) in step 22 and the flow is fed back to step 14 for a new measurement in point $P_2$. Steps 14 to 22 are repeated until no measurement in an additional point should be made and the flow ends in step 23.

As an alternatives the determination of angles of direction $\overline{\alpha}$ for the dominant indirect radiation path in step 16 could be performed by measuring a receiving direction at the receiver for the dominant signal, and thereafter calculate the dominant radiation path using the receiving direction at the receiver as a starting point to determine the angles of direction the dominant signal left the transmitting antenna.

Figure 4:
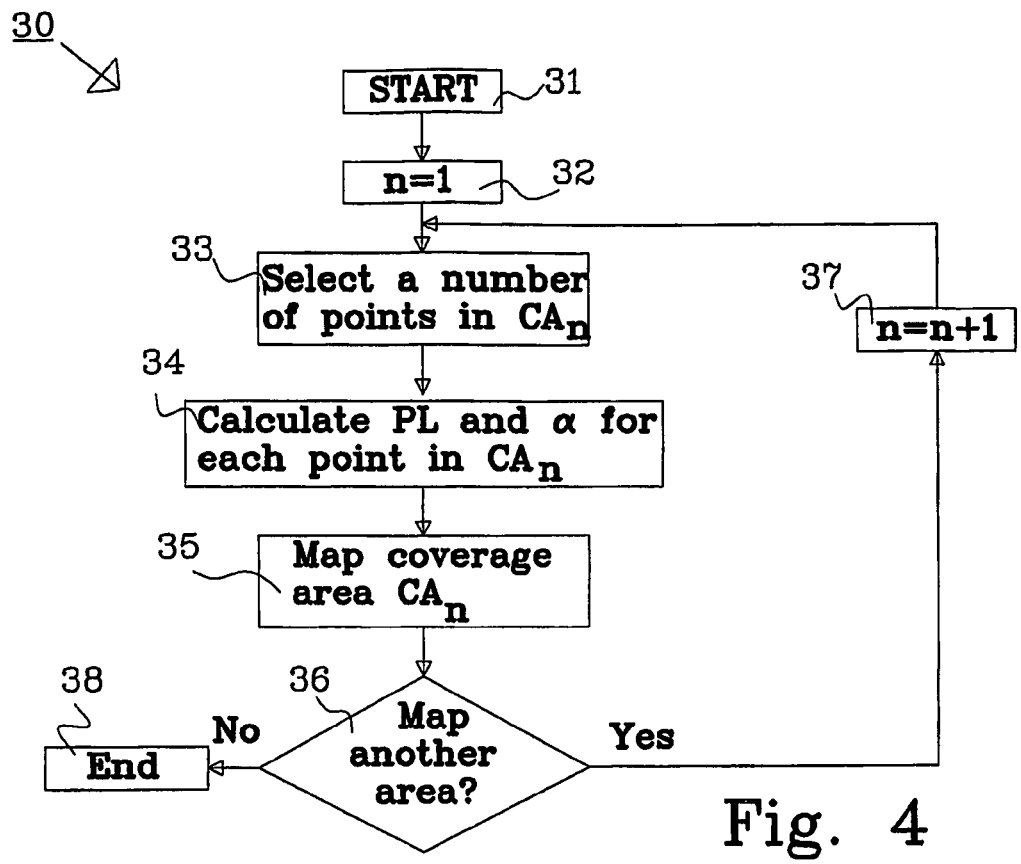
FIG. 4 shows a flow chart for mapping a coverage area according to the invention.

FIG. 4 shows a flow chart 30 for mapping a coverage area according to the invention. The flow starts, step 31, and an integer n is set to 1 in step 32 to indicate the selected coverage area CA that should be mapped. A number of points in $CA_1$ is selected, step 33, and the process of calculating path loss PL and angle of direction $\alpha$ for each selected point in $CA_1$ is performed in step 34 using the flow chart 10 described in connection with FIG. 3.

The coverage area $CA_1$ is mapped using the stored information regarding PL and $\alpha$, step 35, and if another coverage area is selected to be mapped; step 36, the integer n is increased by one (n=n+1) in step 37 and fed back to step 33. Steps 33 to 37 are repeated for selected coverage areas until no other area is selected and the flow ends, step 38.

Figure 5:
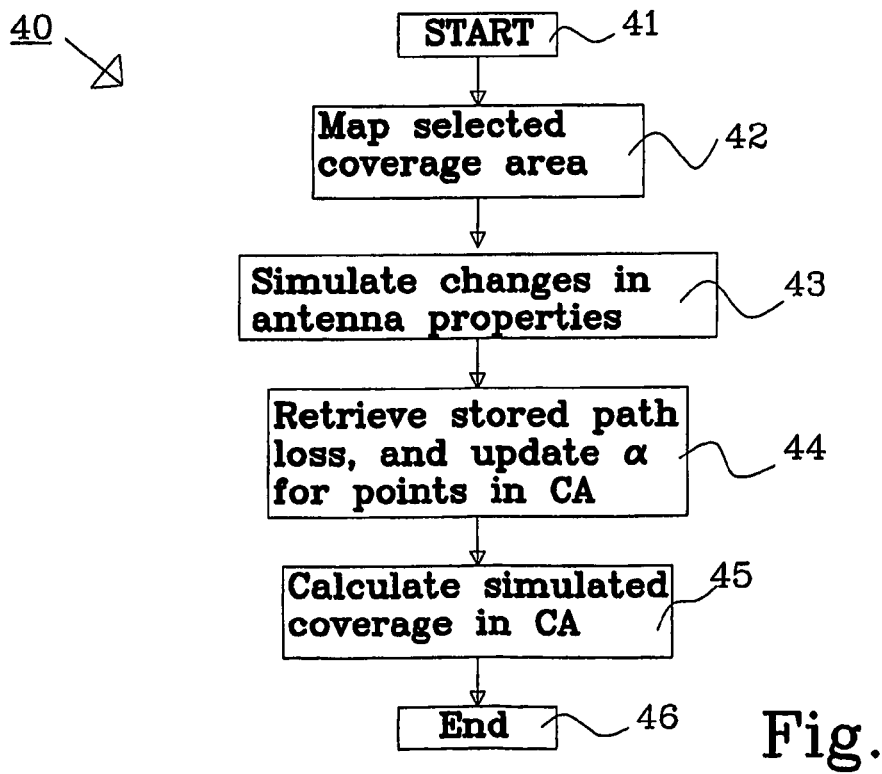
FIG. 5 shows a flow chart for simulating changes in a communication network according to the invention.

FIG. 5 shows a flow chart 40 for simulating changes in a communication network according to the invention. The flow starts, step 41, and the selected coverage area is mapped, step 42, using the flow chart 30 described in connection with FIG. 4. Changes in antenna properties, such as tilting, is simulated, step 43, which will result in changes in the effective antenna gain $G_{ant}$. The stored PL for each point in the selected coverage area are retrieved step 44, from the memory (or database), and $\alpha$ is updated with the changed antenna properties using step 15-18 in FIG. 3 to calculate new angles of direction $\alpha$. A simulated coverage is calculated in step 45 using the new angles of direction α and applying this result to step 43 to calculate the effective antenna gain $G_{ant}$ from step 43. The flow ends, step 46, when the simulated coverage has been calculated.

By using the flow described in connection with FIG. 5, it is possible to avoid making changes that unintentionally will reduce the coverage in a selected CA, and make sure that a suggested change in antenna properties, such as tilting, or changing the antenna input power $P_{in}$ will be not seriously affect the coverage for the users of the communication network.

A system for cell planning is preferably implemented in a control unit, such as a computer, controlling several cell sites. Information regarding all transmitting antennas serving a coverage area which are associated with the cell sites is fed to the control unit. The control unit has access to the memory (or database) where information regarding path loss and angles of direction are stored. Mapping and simulation of coverage areas is performed by the control unit.

The invention claimed is:

1. A method for calculating path loss to a point in a coverage area of an antenna at a cell site, said method comprising the steps of:
   transmitting a signal from the antenna, said antenna having an effective antenna gain, and measuring a received signal strength indicator (RSSI) of the transmitted signal by a receiving antenna at the point;
   determining a dominant indirect radiation path between the antenna and the receiving antenna to establish the effective antenna gain from the antenna in a direction of the dominant indirect radiation path, wherein
      the step of determining the dominant indirect radiation path further comprises the steps of:
         measuring a receiving direction of said transmitted signal at the point, and
         calculating the dominant indirect radiation path using the receiving direction at the point as a starting point to determine the direction of dominant indirect radiation path from the antenna, and
   calculating the path loss to the point using the established effective antenna gain and the measured received signal strength indicator (RSSI).

2. The method according to claim 1, wherein angles of direction are used to express said direction from the antenna.

3. The method according to claim 1, wherein said indirect radiation path is a reflected path of the transmitted signal.

4. The method according to claim 1, wherein said indirect radiation path is a diffracted path of the transmitted signal.

5. The method according to claim 1, wherein said indirect radiation path is a combination of a reflected and a diffracted path of the transmitted signal.

6. A method for mapping a coverage area of an antenna at a cell site, said antenna having an effective antenna gain and transmitting a signal, said method comprising the steps of:
   selecting a plurality of measurement points in said coverage area,
   measuring a received signal strength indicator (RSSI) of the transmitted signal at each measurement point, and
   determining a dominant radiation path between the antenna and the receiving antenna at each measurement point to establish the effective antenna gain from the antenna in a direction of each dominant radiation path, wherein the dominant radiation path to at least one measurement point is indirect, the method further comprises the step:
   calculating the path loss to each point using the established effective antenna gain for each measurement point and measured received signal strength indicator (RSSI), and mapping the coverage area using the calculated path loss.

7. The method according to claim 6, wherein the step of determining the dominant indirect radiation path comprises the steps of:
   measuring a receiving direction of said transmitted signal at the point, and calculating the dominant indirect radiation path using the receiving direction at the point as a starting point to determine the direction of dominant indirect radiation path from the antenna.

8. The method according to claim 6, wherein the step of determining the dominant indirect radiation path comprises the step of using a propagation model to determine the direction of dominant indirect radiation path from the antenna.

9. The method according to claim 8, wherein the used propagation model is a ray-tracing propagation model.

10. The method according to claim 6, wherein the method further comprises the step of storing the path loss and the direction of the dominant radiation path from the antenna in a database.

11. The method according to claim 6, wherein angles of direction are used to express said direction from the antenna.

12. The method according to claim 6, wherein said indirect radiation path is a reflected path of the transmitted signal from the antenna.

13. The method according to claim 6, wherein said indirect radiation path is a diffracted path of the transmitted signal from the antenna.

14. The method according to claim 6, wherein said indirect radiation path is a combination of a reflected and a diffracted path of the transmitted signal from the antenna.

15. The method of claim 6, for simulating changes in a communication network having at least one cell site, each cell site having at least one antenna serving a coverage area, each antenna having an effective antenna gain, wherein at least one coverage area is mapped the method comprises further comprises the steps:
   simulating changes in radiation properties of the at least one antenna,
   reusing the calculated path loss to points within the coverage area of said at least one antenna, and
   calculating a mapping of the coverage area due to the simulated changes.

16. A system for cell planning in a communication network having at least one cell site, each cell site having at least one antenna serving a coverage area, each antenna having an effective antenna gain, characterized in that at least one coverage area is mapped using the method according to, claim 6, wherein the system comprises:
   a memory (M) for storing calculated path loss to points within the coverage area of said at least one antenna,
   a control unit (CU) for simulating changes in radiation properties of at least one antenna using the stored calculated path loss in the memory (M), and
   calculating a mapping of the coverage area due to the simulated changes.

* * * * *

UNITED STATES PATENT AND TRADEMARK OFFICE
CERTIFICATE OF CORRECTION

| | | |
|---|---|---|
| PATENT NO. | : 8,229,483 B2 | Page 1 of 1 |
| APPLICATION NO. | : 12/440325 | |
| DATED | : July 24, 2012 | |
| INVENTOR(S) | : Engstrom | |

It is certified that error appears in the above-identified patent and that said Letters Patent is hereby corrected as shown below:

In Column 4, Line 36, delete "alternatives" and insert -- alternative, --, therefor.

Signed and Sealed this
Eighteenth Day of December, 2012

David J. Kappos
*Director of the United States Patent and Trademark Office*